United States Patent

[11] 3,545,512

| [72] | Inventor | William H. Baker<br>Wilmington, Del. |
|---|---|---|
| [21] | Appl. No. | 803,394 |
| [22] | Filed | Feb. 28, 1969<br>Continuation-in-part of Ser. No. 722,267,<br>April 18, 1968, abandoned. |
| [45] | Patented | Dec. 8, 1970 |
| [73] | Assignee | American Mushroom Corporation<br>Wilmington, Del. |

[54] MUSHROOM HANDLING APPARATUS
12 Claims, 9 Drawing Figs.

[52] U.S. Cl. .................................................. 146/81,
146/224
[51] Int. Cl. ...................................................... A23n 15/04
[50] Field of Search .......................................... 146/81 78,
224

[56] References Cited
UNITED STATES PATENTS
1,400,290 12/1921 Johannes ..................... 146/86

3,164,182 1/1965 Hughes et al. ................ 146/81
3,179,138 4/1965 Norris .......................... 146/81

*Primary Examiner*—Willie G. Abercrombie
*Attorney*—Browdy and Neimark

ABSTRACT: An improved apparatus is provided for handling mushrooms hydraulically in a tank or series of tanks by generally flowing the mushrooms from a mushroom reservoir in an upstream location through a series of devices to a final downstream location where the mushrooms are cut to remove the roots and to separate the stems from the caps. The apparatus includes an improved device for controlling the rate and quantity movement of mushrooms which are being hydraulically fed; an improved device for axially orienting the mushrooms into axial rows; an improved device for directionally orienting the axially oriented mushroom so that the caps face in the same direction; a device for receiving the directionally oriented mushrooms and for uniformly refeeding them sequentially in timed relationship in an improved manner; and a cutting device.

Fig. 4.

INVENTOR
WILLIAM H. BAKER
BY
Brondy Neumark
ATTORNEYS

PATENTED DEC 8 1970

INVENTOR
WILLIAM H. BAKER

BY Brady & Nimark

ATTORNEYS

MUSHROOM HANDLING APPARATUS

This application is a continuation-in-part of my earlier application Ser. No. 722,267 filed Apr. 18, 1968, now abandoned.

The present invention relates to a mushroom handling apparatus and, more particularly, to a system for handling mushrooms hydraulically and including improved means for controlling the feed rate, orienting the mushrooms and step-feeding the mushrooms to a cutter; cutting means are also provided.

Many mushroom handling and trimming devices have been contemplated in the prior art because of the great need for automating the conventionally used systems of grading, handling, and trimming mushrooms by hand. All such prior art devices have, insofar as is known, failed in their intended objective of automating the handling and trimming of mushrooms. Part of the problem resides in the particular characteristics of mushrooms themselves; they retain some surface dirt even after having been cleaned and they are very fragile. The prior art devices have uniformly been subjected to clogging from dirt particles from the mushrooms; they have also caused problems due to injuring mushrooms because of the very fragile nature of the mushrooms.

Some types of mushroom handling and trimming devices contemplated have included dial-type mushroom cutters; such devices are not only slow, but require hand insertion of the mushroom into the cutter carrier and thus the devices are, at best, only semiautomatic. Manual feeding is an expensive and time consuming operation.

It is, accordingly, an object of the present invention to obviate the deficiencies of the prior art, such as indicated above.

It is another object of the present invention to provide for a mushroom handling system which is entirely automatic, and which is fast, self-cleaning, flexible in its use and is dependable.

It is another object of the present invention to provide for the novel handling of mushrooms in an unobvious manner.

It is another object of the present invention to provide a novel and unobvious apparatus for the handling of mushrooms hydraulically.

It is another object of the present invention in the apparatus of parent copending application Ser. No. 722,267 to provide improved feed rate controlling means; to provide improved mushroom orienting means; and/or to provide improved step-feeding means.

These and other objects and the nature and advantages of the instant invention will become more apparent from the following detailed description taken in conjunction with the drawings wherein.

Figures 7, 8:
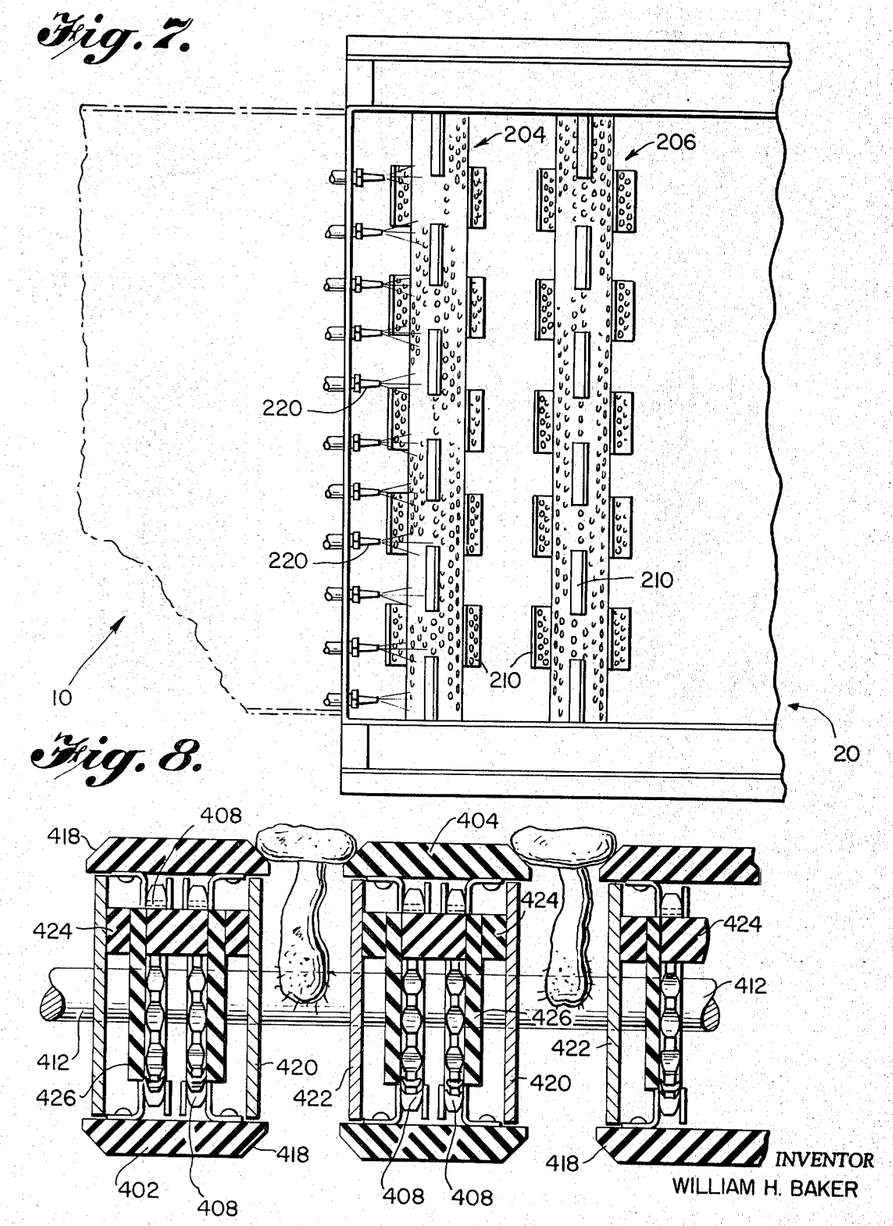
FIG. 7 is a plan view taken along line 7—7 of FIG. 1.
FIG. 8 is a vertical sectional view taken along line 8—8 of FIG. 2 through the directional orienting means.

An illustrated embodiment of a mushroom handling apparatus in accordance with the present invention is shown in the drawing and comprises, in general, an elongated mushroom reservoir tank 10 shown in phantom in FIG. 7 and described in detail in my copending application Ser. No. 722,267; a suitable means 20 for controlling the rate and quantity movement of the mushrooms being fed from the reservoir 10 which is immediately upstream therefrom and in direct communicating relationship therewith; a means 30 for axially orienting the mushrooms into at least one row of mushrooms, but preferably a plurality of rows, each row being along a single axis; a device 40 for directionally orienting the previously axially oriented mushrooms so that the cap of each mushroom is facing in the same direction; a step-feeding device 50 for receiving the directionally oriented mushrooms and for uniformly refeeding such mushrooms sequentially in timed relationship with one another; an inverting or reversing conveyor 60 generally described in my copending application Ser. No. 722,267; and a cutting or trimming device 70, also described in my copending application Ser. No. 722,267. It should be understood that not all of the above-mentioned components are essential, and that the single illustrated embodiment may be changed, certain portions replaced by others and certain portions deleted without exceeding the scope of the invention. It is an important aspect of the present invention, however, that the apparatus be capable of handling mushrooms in an hydraulic medium.

In essence, the disclosed apparatus performs two complex functions, entirely automatically. It indexes the mushrooms, such that they are fed into the trimming or cutting mechanism at the proper rate, in the proper position, and one at a time. And it trims or cuts the mushrooms, by severing the root from the stem at a predetermined distance measured up the stem from the bottom of the root, and by severing the stem from the cap at a predetermined distance measured down the stem from the under side of the cap. The present invention relates to improvements in the indexing function of such an apparatus.

The present apparatus is designed to handle mushrooms automatically which have already been thoroughly washed. Also, all clump mushrooms prior to being fed to the present apparatus will have been separated into individual mushrooms and all broken mushrooms will have been removed. Furthermore, the mushrooms will have been graded into individual grades (sizes) of mushrooms based primarily on the diameter of the mushroom caps. Accordingly, the following description presupposes treatment of individual, washed mushrooms having a given and generally consistent cap diameter.

Figure 1:
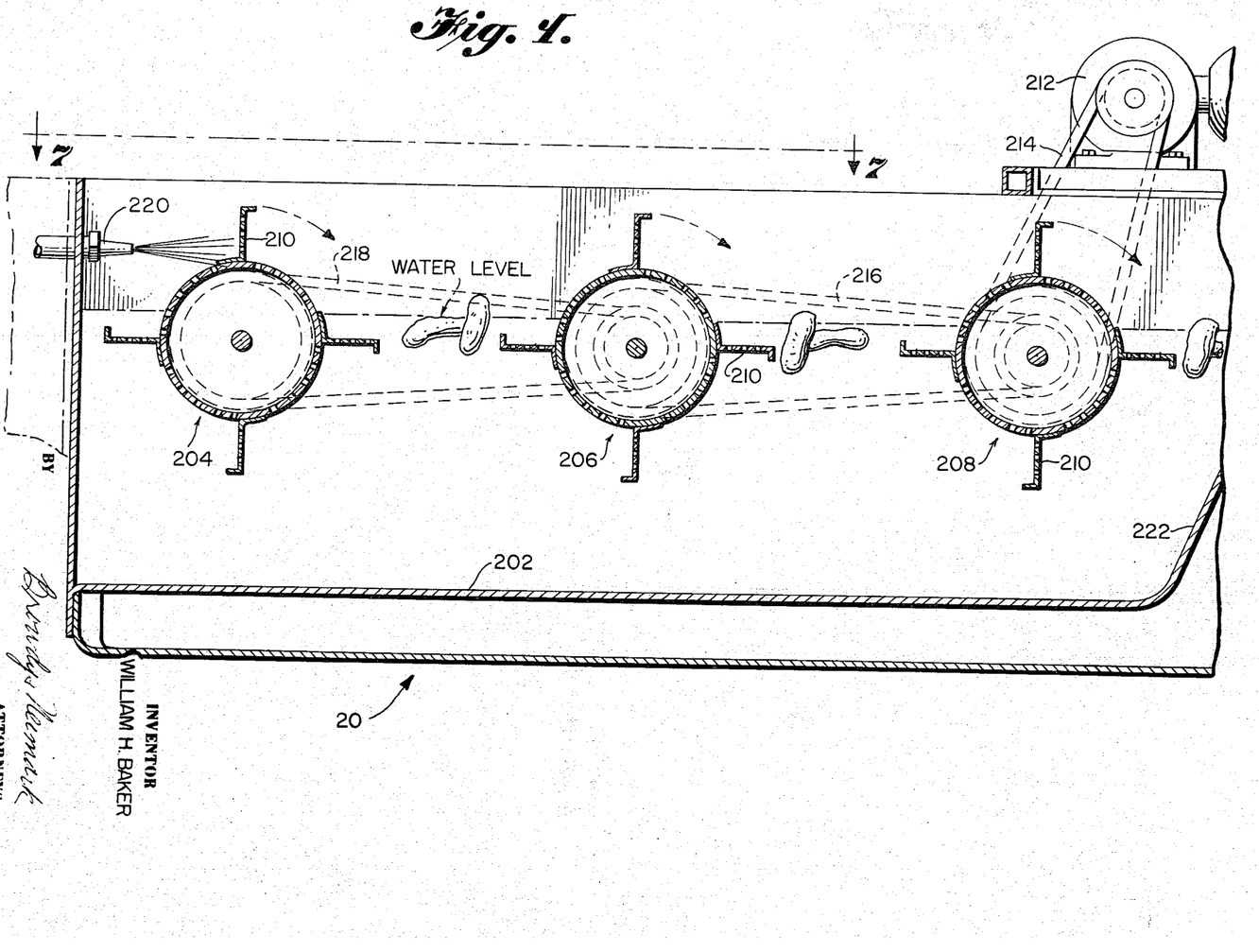
FIG. 1 is a vertical sectional view of an improved means for controlling the feed rate of the hydraulically flowing mushrooms of an embodiment in accordance with the present invention.

Once the mushrooms have been graded, each of the sizes is handled separately in a different apparatus, each being in accordance with the present invention and adapted to handle mushrooms of a particular size. Thus, mushrooms of a given size are passed into a holding tank or reservoir 10 of relatively large size. Water is fed to the reservoir to provide a head of water for continuously hydraulically conveying the mushrooms to the distribution means 20 for controlling the rate and quantity movement of the mushrooms being continuously hydraulically fed. Such a distribution means 20 comprises, disposed in a water holding distribution tank 202 which physically may be a mere extension of the reservoir tank 10, a series of transversely extending perforated or otherwise foraminous paddle wheels or distribution drums, in the illustrated embodiment comprising three paddle wheels or drums 204, 206 and 208. These paddle wheels are preferably cylindrical as illustrated and are provided along the periphery thereof with a series of perforated or otherwise foraminous paddles 210. As can best be seen in FIG. 7, the paddles 210 are preferably staggered in adjacent rows, and are most preferably of sufficient width so that at their edges they provide an overlapping path such as illustrated by the dimension A in FIG. 7. While three such perforated paddle wheels are shown in FIG. 1, it will be understood that a lesser or greater number may be used, but preferably 2 or 3 paddle wheels in series are all that are necessary or desirable.

In accordance with the illustrated embodiment, the first foraminous paddle wheel 204 will turn at a given speed, the perforated paddles dipping into and under the water to lift up the mushrooms from the surface where they float, and carry them thereover depositing them downstream. This controls the rate of feeding. The second paddle wheel 206 in the present embodiment, immediately downstream from the first, rotates at a speed twice as fast as the first wheel 204 and thereby removes all the mushrooms between the two wheels so that no accumulation will be provided. Where a third wheel 208 is provided, such wheel 208 will rotate at a speed twice as fast as the second wheel 206, this also preventing the accumulation of mushrooms between the second and third wheels. As can be seen in FIG. 1, all three wheels may be driven by a single motor 212 operating through suitable driving means such as the belts 214, 216 and 218. The details of construction of the driving mechanism will be readily apparent to those having normal skill in the art and other driving means can be utilized as desired.

Another feature of the distribution means 20 is the provision of spray jets 220, and these serve the dual purpose of creating a head of water and also insuring that no mushrooms become hung up or stuck on the paddle wheels or the paddles. As is seen from FIG. 7, the spray jets 220 are disposed across the width of the device. Noting FIG. 1, it is seen that they are preferably pointed so as to discharge their spray jet across the top of the rotating paddle wheel 204. It will be understood that an additional bank of such water jets (not illustrated) may be used above and adjacent each of the other foraminous paddle wheels 206 and 208.

It should be pointed out that the foraminous paddle wheels are generally related in size to the grade of mushrooms being handled. For a medium size mushroom the wheels will preferably be on the order of about six inches in diameter and the arms 210 will extend axially about two inches; the arms 210 preferably are provided in progressively smaller sizes as the size of the mushroom being handled is decreased.

Figure 4:
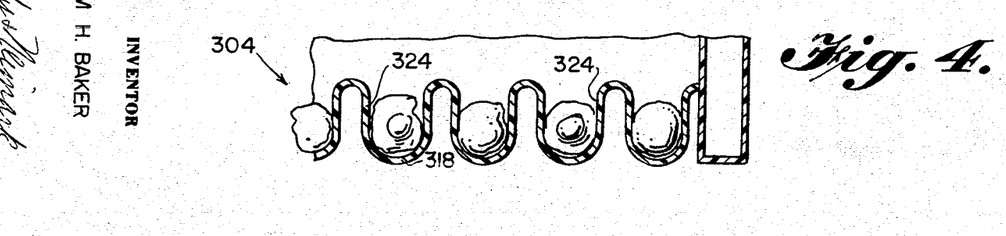
FIG. 4 is a vertical section taken along line 4—4 of FIG. 2 through the axial orienting means.

Whereas, in the illustrated embodiment, the reservoir 10 and the distribution means 20 including the distribution tank 202 are all relatively wide, it will be understood that an axial orienting device is narrow in width; however, in order to handle the desired capacity leaving the downstream end of the distributor 20, it is desirable to provide a plurality of parallel axial orienting devices in side-by-side relation which together constitute the axial orienting means 30. The number of axial orienting devices in parallel will depend upon the width of the apparatus and the grade of mushrooms being handled, it being noted in FIG. 4 (a partially broken away view) that five devices in parallel are shown. The axial orienting means 30 has two functional parts, i.e. means 302 for directing the mushrooms into at least one row and preferably a plurality of rows, and means 304 to align and conduct the mushrooms which consist of U-shaped flumes as best shown in FIG. 4.

Figure 2:
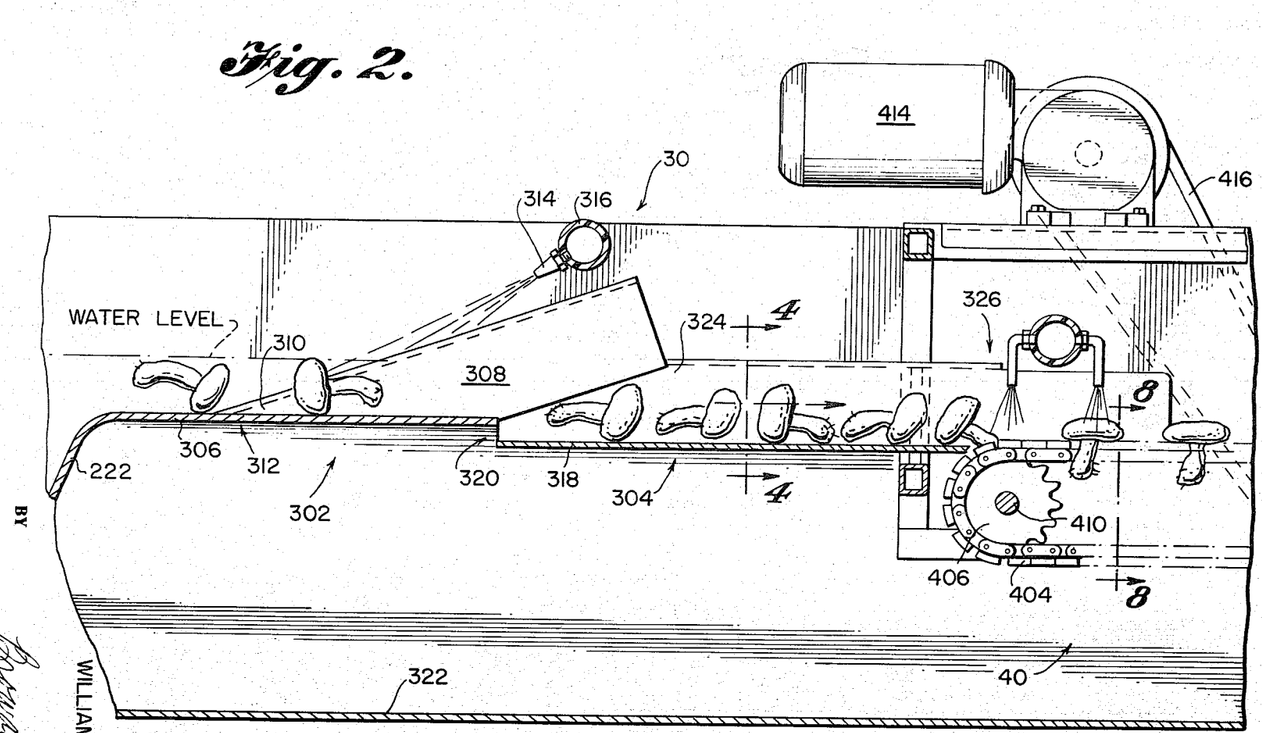
FIG. 2 is a vertical sectional view immediately downstream from FIG. 1 showing means for axially orienting the mushrooms and a portion of the means for directionally orienting the mushrooms.

Noting FIG. 1 it is seen that immediately downstream from the last distribution drum 208, the bottom wall of the distribution tank 202 slopes upwardly at 222 until it reaches a point shown in FIG. 2 where the bottom wall 306 at the entrance to he axial orienting means 30 underlies the water level by only the approximate cap diameter of the grade of mushrooms being serviced. Because of this shallow depth above the bottom wall 306, the current will be relatively great through the axial orienting means compared with the current in the distribution means 20.

Spaced closely to the beginning of the bottom wall 306 are the means 302 for directing the mushrooms into a plurality of parallel rows. Such means 302 in the illustrated embodiment comprise a plurality of laterally spaced, longitudinally extending, inverted U-shaped baffles 308 located side-by-side (only the side of one being illustrated). As is seen in FIG. 2, the inverted U-shaped baffles are inclined at an angle (which, in the illustrated embodiment, is about 20°), and the leading portion 310 of the baffle 308, which constitutes the upper part of the inverted U, blends into the floor 306 along a V-shaped merger zone 312. Two of these baffles 308 spaced apart side-by-side will provide one corridor therebetween which provides for directing the mushrooms into a row. A plurality of such baffles spaced side-by-side will provide between adjacent baffles a plurality of such corridors. The spacing between adjacent baffles 308 will correspond to the size of mushrooms being handled, i.e. the distance between vertical sidewalls of adjacent baffles 308 will be slightly greater than the largest cap diameter of the grade of mushrooms being handled.

Immediately above each baffle 308 is located a water jet spray 314 fed through a hose 316. As is seen in FIG. 2, the nozzle 314 align the spray so that it impinges on top of the inverted U and moves down to the zone 312. The water jet spray causes an hydraulic lift around the V-shaped zone 312 and serves to maintain a head at this point. The spray also serves to prevent any mushrooms from being caught on the top of the baffle 308. The combination of the water jet sprays 314 and the inverted U-shaped baffles 308 serve to direct mushrooms into rows or corridors located between the baffles 308 and from here they pass to the portion 304 which serves to axially align the hydraulically fed mushrooms.

As can be seen from FIG. 2, the bottom wall 306 ends immediately downstream from the baffles 308 and at this point the axial aligning section 304 begins. A plurality of openings 320 are provided along the width of the device below the terminal end of the bottom wall 306. A quantity of water flows through these openings 320 to the bottom of the holding tank (designated by the numeral 322) in which the device is located. The smaller quantity of water flowing through the aligning section 304 provides a greater flow rate which improves alignment.

As best seen in FIG. 4, the aligning section 304 comprises a plurality of U-shaped parallel flumes each having a bottom wall 318 and side walls 324 of spacing only slightly greater than the diameter of the mushrooms being handled. As in my copending application Ser. No. 722,267, the flow of water through the flumes causes and maintains axial orientation of the mushrooms with either the cap first or the stem first, the relatively high water flow rate serving to maintain axial alignment. While the flumes are shown as being disposed horizontally, it will be understood that they may be advantageously sloped slightly downhill from their upstream ends (each terminating at an opening 320) to their downstream ends. The axial orienting means 30, having corridors between the baffles 308 and downstream flumes 324 only slightly wider than the diameter of the caps of the particular size of the mushrooms being handled, insures that the mushrooms will align themselves with their long dimensions parallel to the vertical walls of the baffles 308 and the flume vertical walls 324 as they move through the axial orienting means 30, and the mushrooms will be conveyed through the flumes either cap first or root first; accordingly, a row of mushrooms all axially oriented is provided in each flume.

As the mushrooms leave the downstream end 326 of the flume of the axially orienting means 30 they pass to the means 40 for directionally orienting the mushrooms so that the cap of each mushroom is facing in the same direction. This directional orienting means 40 is very similar to that in the parent application Ser. No. 722,267, except as to details of construction best seen in FIG. 8. The means 40 generally comprises a pair of segmented conveyor belts 402 and 404 which have a coplanar horizontal top flight and which define therebetween a space sufficiently great to receive the stem of the average stem diameter mushroom being handled, such space not being big enough to receive the average cap diameter of the mushrooms. The endless segmented belts 402 and 404 pass about support wheels 406 and 408 which are provided with horizontal axles 410 and 412, respectively. The axles are supported in a suitable manner, and one of the axles, such as axle 412 may be driven by a motor 414 through a suitable driving means such as the belt 416. It will, of course, be understood that a pair of segmented conveyor belts 402 and 404 are provided for each flume as in parent application Ser. No. 722,267.

As illustrated in FIG. 8, it is preferred that the segmented portions of the belts 402 and 404 be provided with a truncated, inverted V-shape and that such belts thereby define therebetween a space having a truncated V-shape. As illustrated, the walls 418 of the conveyor segments forming the truncated V serve to support the caps of the mushroom. Extending below the truncated V are a pair of vertical guideplates 420 and 422, the purpose of which are to restrain any pendulum swinging of the mushroom stem sufficient to permit the mushroom to rotate so that the cap might fall through the truncated V; such vertical guideplates are rigidly mounted by crosspieces 424 which are connected to support plates 426, such support plates 426 riding on and being supported by the axles 410 and 412.

At the downstream end of the endless conveyor belts 402 and 404, located between vertical guideplates 420 and 422 and over the axle 412 (but not shown in FIG. 8), is a stem stop means 428 which is preferably merely a curved plate which may be suitably mounted downstream as at 430.

As the mushrooms leave the flumes of the axial orienting device 30 at the water level, either root first or cap first, they drop down onto the pairs of spaced endless conveyor belts 402 and 404 as shown in FIG. 2; the horizontal spacing of these belts is, as pointed out above, such that the mushroom cap is too large to pass through the space between the conveyors. As the mushrooms are conveyed along the conveyor, the root and stem fall through while the cap remains supported. In the meantime, the water falls through into the holding tank 322, the level of which is sufficiently below the top flight of the endless segmented conveyors 402 and 404 so that the roots of the suspended mushrooms clear such water level.

Figures 3, 5, 6:
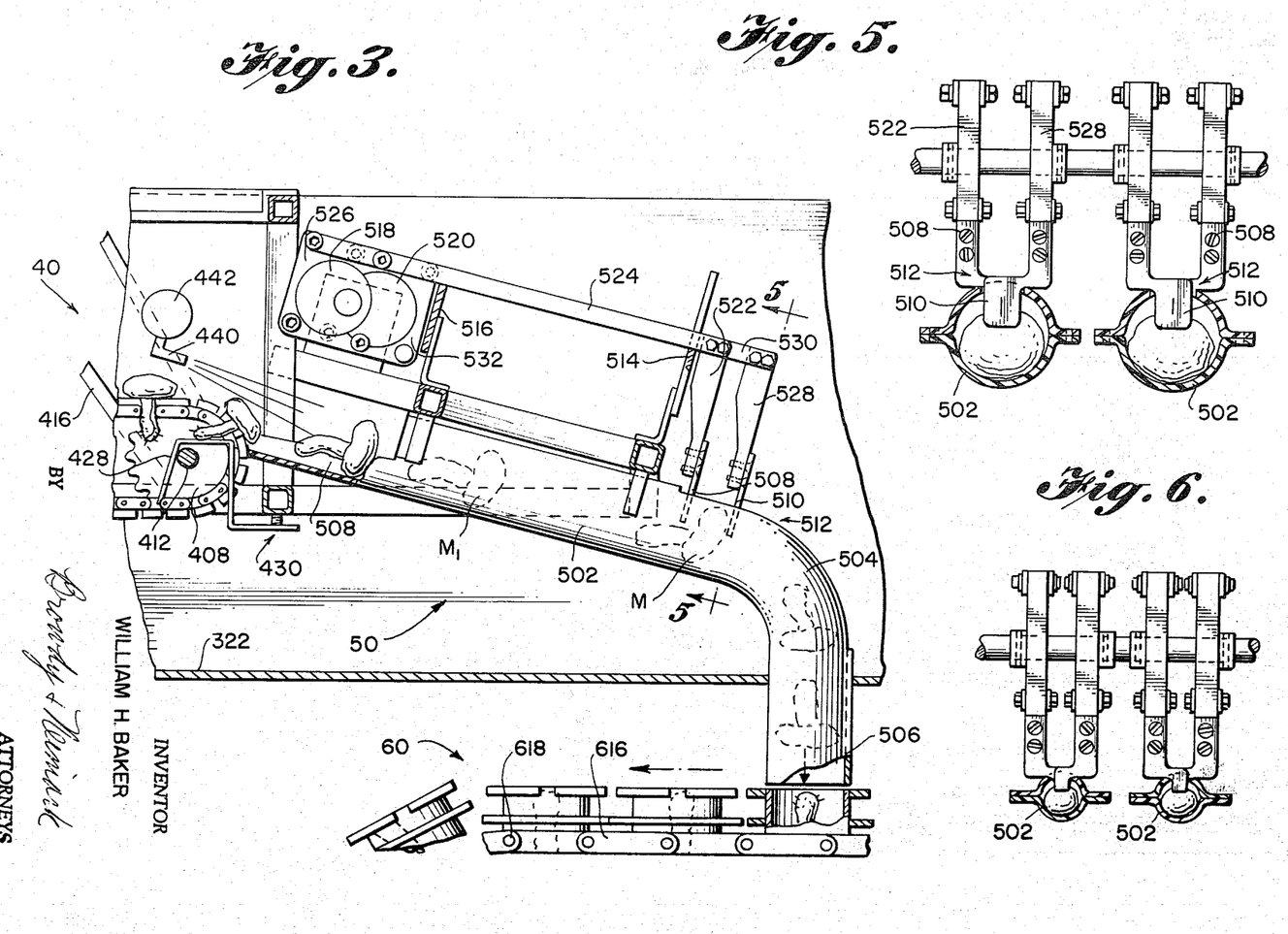
FIG. 3 is a sectional view immediately downstream from FIG. 2 showing a portion of the directional orienting means and a step-feeding means (a device for uniformly refeeding mushrooms in sequentially timed relationship) and the top of a reversing conveyor means.
FIGS. 5 and 6 are vertical sectional views taken along line 5—5 of FIG. 3 through the step-feeding means and showing the comparative size of the device for two different grades of mushrooms.

As the mushrooms are conveyed downstream by the movement of the conveyors 402 and 404 in the clockwise direction as viewed in FIGS. 4 and 5 and reach the downstream end of the top flight of such conveyors, the stems engaged the stem stop means 428 causing the mushrooms to fall cap first off the downstream end of the top flight of the conveyors. Therefore, the mushrooms will enter the step-feeding device 50 cap first. The vertical guideplates 420 and 422 prevent any substantial sidesway of the stems which might allow the caps to fall through the V-space as the mushrooms travel the length of the conveyors.

The means 50 for receiving the directionally oriented mushrooms and for the refeeding of the mushrooms sequentially in timed relationship with one another comprises, for each pair or spaced conveyors 402 and 404, a downwardly sloping tube 502, preferably of circular cross section and having a curved portion 504 near the bottom thereof and terminating in a straight vertical section 506. The tube 502 preferably has an internal diameter only slightly greater than the average cap diameter of the mushrooms being handled and, noting FIG. 6 in comparison with FIG. 5, it will be seen that a machine intended to handle a smaller grade mushroom will have correspondingly smaller feeding tubes 502. The upstream mouth of the tube 502 is located slightly above the water level, but a water jet nozzle 440 supplied by a supporting pipe 442 causes some flow of water to pass into and through the tube along with the mushrooms. Such upstream mouth of the tube 502 may comprise a U-shaped portion 508 which serves as a ramp along which the mushroom slides cap first before entering the closed portion of the tube 502.

Near the downstream end of the tube 502 and immediately above the bend 504 is located a pair of gates 508 and 510, which gates are adapted to slide within an axial opening 512 cut through the top of the tube. In the position shown in FIG. 3, the gates 508 and 510 are spaced relatively closely together a distance apart only slightly greater than the average cap height of the mushroom being handled.

Suitable means are provided to synchronously open and close the gates so that one gate is always closed. In the present embodiment, these gates are controlled in their movement by a pair of rigidly mounted cam plates 514 and 516 and a pair of circular rotating eccentrics 518 and 520. Thus, the gate 508 is attached to a linkage 522 which, in turn, is connected at right angles to an arm 524, such arm 524 being mounted at its opposite end to a bushing 526 in which the eccentric 518 rotates. Similarly, the gate 510 is mounted on a linkage 528 which is mounted on an arm 530, the end of which is connected to a bushing 532 in which the eccentric 520 rotates. The movement of the gates 508 and 510 are synchronized with the cutting device (described below) to insure that the mushrooms are fed one at a time and at a rate corresponding to the rate of movement of the turning conveyor.

As the eccentrics 518 and 520 rotate 360° the gates pass through four different locations at each 90° interval as follows:

(1) As illustrated in FIG. 3 at one position both gates 508 and 510 are closed;

(2) As the eccentrics rotate 90° the gate 508 moves from the position shown in FIG. 3 to the position about halfway between the illustrated positions of the gates 508 and 510 due to the action of the arm 524 sliding on the bearing plate 514; in the meantime the gate 510 moves upwardly (thereby opening) and backward slightly due to the action of the cam plate 516 on the arm 530;

(3) As the eccentrics rotate another 90° both gates are again closed, but this time the gate 508 is downstream from the gate 510 (the positions are reversed from that illustrated), the location of the gates again being controlled by the location of the eccentrics and the action of the bearing plates 516 and 514 on the arms 524 and 530;

(4) After another 90° rotation the gates are in the reverse position described in step (2) above with the gate 508 open and the gate 510 located halfway between the illustrated gate positions in FIG. 3; and (5) the last 90° of rotation brings the apparatus to the position illustrated in FIG. 3 with both gates closed.

As shown in FIG. 3, the mushrooms are turned cap first into the mouth 508 of the tube 502 as they leave the orienting belts 402 and 404 at the downstream end of the direction orienting means 40. Water from the sprays 440 propels the mushrooms from the end of the conveyors 402 and 404 and into the tubes 502 and this water flows through he tubes with the mushrooms. Water from the flumes 326 simply spills over and between the tubes 502 and then down to the holding tank 322. The tubes 502 trap the mushrooms and convey them, cap first, to the reversing or inverting conveyor 60 of the trimming mechanism, the movement of the mushrooms being facilitated by the flow of water through the tubes 502.

As indicated above, the gates 508 and 510 work in synchronism with the cutting mechanism to pass one mushroom at a time to the reversing conveyor. One of the gates 508 and 510 is always closed (in the down position). The space between the end of the gate and the bottom edge of the tube 502 being too great to permit the passage therethrough of the cap of the mushroom as shown in FIGS. 3, 5 and 6, but such space being great enough to permit passage therethrough of the mushroom stem, it is seen that each gate will control the passage through the tube 502 of every other mushroom. For example, as illustrated, the gate 510 is holding the mushroom M; in the meantime, the mushroom $M_1$ is moving down the tube 502 and will strike either the stem of the mushroom M or the gate 508. As the eccentrics 518 and 520 rotate, the gate 510 will lift permitting escape of the mushroom M, but the gate 508 will prevent the mushroom $M_1$ from moving thereby. As the eccentrics continue to rotate, the mushroom $M_1$ will be held by the gate 508 in the precise position illustrated for the mushroom M and the gate 510. The operation of the device will be clear from the present description.

The water constantly moving through the apparatus serves not only to assist in the feeding of mushrooms to and through the axial orienting means 30, to the directional orienting means 40, and through the step-feeding means 50, but such water also helps to maintain the equipment clean by constantly removing any dirt from the conveyors 402 and 404 which might accumulate thereon, and by cleaning any dirt from the tubes 502 which might accumulate therein.

As described above, the trimming mechanism comprises generally two roller chain conveyors 60 and 70, each with its own framework, and the former overlaying the latter. The upper conveyor 60 is adapted to accept mushrooms, cap first, from the feed stepping device 50. Such conveyor 60 transports the mushrooms to its underside, where they are then engaged by the lower conveyor 70, to be ultimately cut.

The upper or reversing conveyor 60, as well as the lower or cutting conveyor 70, are each provided with a sufficient number of parallel disposed, laterally spaced operative components so as to be consistent with the number of feed-stepping tubes 502 which are provided; in other words, if there are six flumes in the axially orienting means 30 which feed to six pairs of segmented, spaced conveyors 402 and 404 in the directional orienting means 40, which in turn feed to six downwardly inclined feed-stepping tubes 502, then the upper or reversing conveyor 60 and the lower or cutting conveyor 70 will each be provided with, across their transverse widths, six portions, all operating together in parallel.

Each transversely extending row of cavities 610 is maintained together on the conveyor by a transversely extending plate 612 near the outer portion (top along the upper flight) of each cavity 610. Closing the inner portions (bottom along the upper flight) of the cavities 610 is a transversely extending plate or rod 614. The plates 612 are each connected to a pair of endless chains 616 by suitable links 618. In turn, the chains 616, at each transverse side of the conveyor 60, are endlessly driven about suitable conveyor wheels (not shown) which are supported by a suitable supporting structure.

Surrounding the outermost end of each mushroom holding cavity 610 are a pair of transversely extending facing plates 620 and 622 which, during the horizontal top flight of the upper reversing conveyor 60, are coplanar. Such plates 620 and 622 are connected at each end by suitable linkages to the endless chains 616. The plates 620 and 622 define therebetween semicircular openings which together define circular openings which surround each mushroom holding cavity 610.

A curved plate 628 is provided adjacent the conveyor 60 as it moves from its upper flight to its lower flight. Such curved plate 628 serves the function of preventing the mushrooms from falling out of the cavities 610 as such cavities 610 are turned upside down due to the rotation of the upper conveyor 60 in a counterclockwise direction. The plate 628 is preferably maintained lubricated (i.e. wet) by the spraying of water thereover.

As the upper conveyor 60 moves, the mushroom holding cavities 610 together with the holes defined by semicircular openings line up with the step-feeding tube 502 outlet, and the mushrooms drop into the mushroom holding cavities 610, cap downwardly.

The upper conveyor facing plates 620 and 622 provide a positive means to prevent shearing of the mushrooms as the moving mushroom holding cavities 610 pass under the fixed step-feeding tubes 502. As the conveyor 60 continues to move after receiving the mushrooms from the step-feeding tubes 502, it turns along its sprocket wheel and begins to face the curved plate 628, such curved plate 628, preventing the mushrooms from falling out of mushroom holding cavities 610 prematurely. As the upper conveyor 60 has turned about its sprocket wheel to the lower flight thereof, the mushrooms are then pointing root downwardly supported by the bottom end 630 of the plate 628.

The lower or cutting conveyor 70, like the upper reversing conveyor 60, extends transversely in the disclosed embodiment in several rows, there being a standard roller chain 702 for driving and supporting the intermediate structure at each side thereof. The chains 702 are supported by suitable sprocket wheels 704, 706 and 708, at each side thereof, which are in turn supported by suitable axles 710, 712 and 714, respectively, the axles in turn are provided with suitable supporting structure.

Supported by the endless conveyor chains 702 via suitable upstanding lengths 718 are pairs of outer, relatively thin, coplanar facing plates 720 and 722 which define therebetween mushroom stem receiving openings 742, each thin facing coplanar plate 720 and 722, contributing generally semicircular portions to said circular openings.

Lying slightly within (directly below when considering the top flight) of the relatively thin coplanar facing plates 720 and 722 are a second pair of relatively thin coplanar facing plates 730 and 732. The details of construction of these plates and their manner of support is disclosed in detail in parent application Ser. No. 722,267 to which reference is again made. Provided along the upper flight of the lower cutting conveyor 70 are suitable sets of cutting blades including a first set 740 and a second set 742, both being cantilevered and located between the upper facing plates 720, 722 and the lower facing plates 730, 732 as described in parent application Ser. No. 722,267. A stationary root supporting slider plate 750 is provided along the top flight of the lower conveyor 70 beneath the lower facing plates 730,732 and spaced therefrom a distance equal to the average root length of the mushroom being handled.

The upper reversing conveyor 60 and the lower cutting conveyor 70 are positively synchronized with one another, such that holes or stem receiving depressions 724 in the lower conveyor are aligned with the mushroom holding cavities 610 in the upper conveyor.

The facing plates 720 and 722, and 730 and 732 on the lower conveyor 722 open up as the conveyor turns about its sprocket wheels such as the sprocket wheel 704, as a result of the angular motion of the chains 702. The curved plate 628 of the upper conveyor 20 ends its lower portion 630 at the point where the trailing plates 720 and 730 on the lower conveyor 70 are wide open. Therefore, the mushroom falls, root downwardly, at this point until it bears on the root supporting plate 750, supported at each transverse edge by the conveyor supporting structure. As the two conveyors move, the trailing plates 720 and 730 close to move closer to the leading plates 722 and 732 thereby trapping the stem of the mushroom in the hole formed between the pairs of facing plates. However, the mushroom is not held tight by this action. At this point, the cap of the mushroom is trapped in the mushroom holding cavity 610 of the upper conveyor 60, while the stem is trapped in he holes 724 in the plates of the lower conveyor 70. The mushroom is free to move vertically restricted only by its root resting on the root support plate 750.

Figure 9:
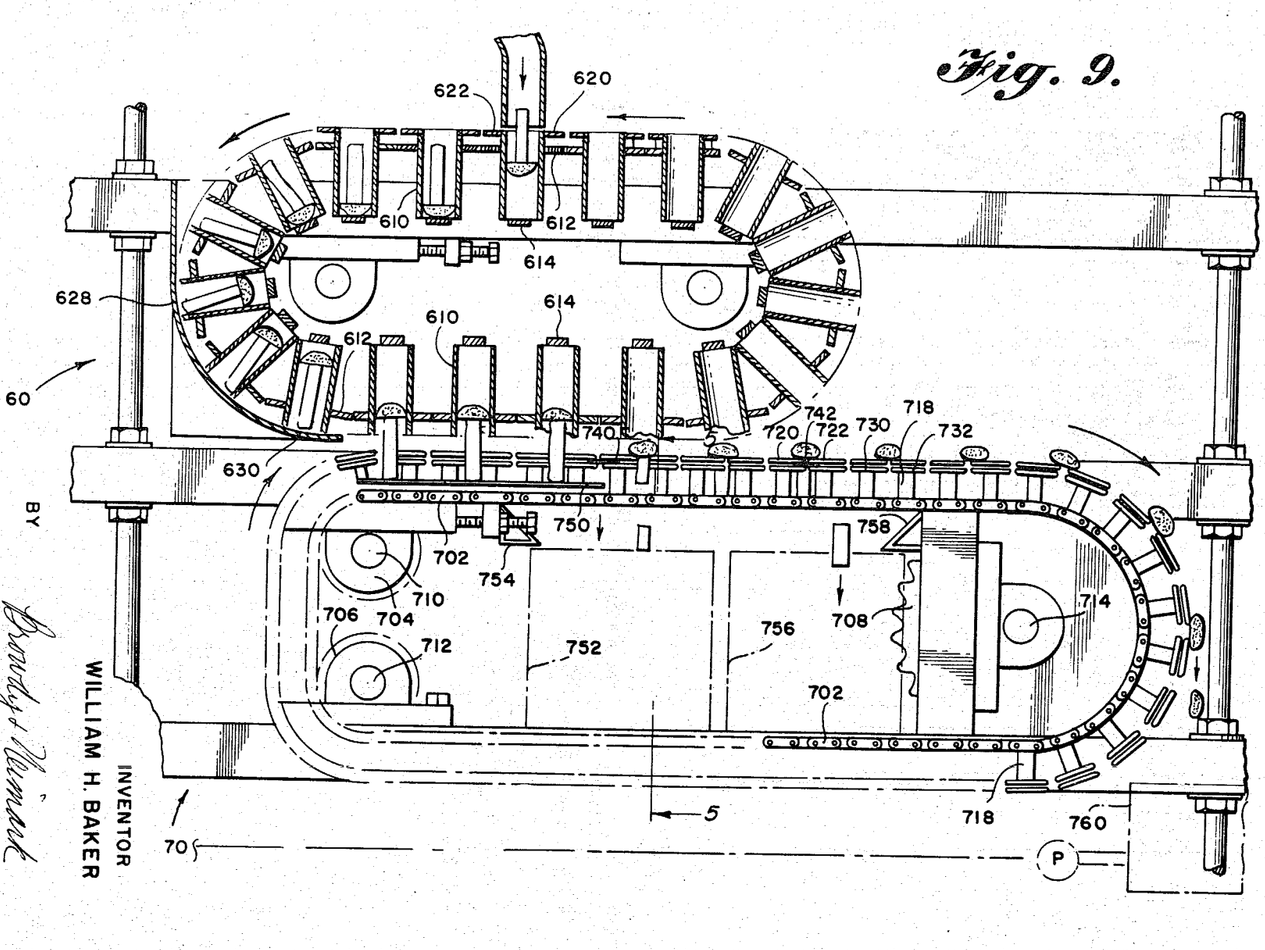
FIG. 9 is a vertical sectional view of an embodiment of the present invention taken downstream from FIG. 3 and showing a reversing conveyor and a cutting conveyor generally in accordance with the embodiment of copending application Ser. No. 722,267.

All the water passing from the apparatus above, shown diagrammatically in FIG. 9 passing adjacent the curved plate 628, is directed at the juncture of the upper and lower conveyors by the curved plate 628. The force of the water at this point assists in preventing the root of the mushroom from hanging up on the upper trailing plate 720 as the mushroom root engages the lower conveyor. The first cutting blades 740 are mounted along the length of the top flight of the conveyor 70 in the vicinity of the trailing edge of the root support slider plate 750. As the mushrooms are conveyed serially over the root support plate 750, each first engaged a first fixed blade 740. That part of the root that extends below the blade 740 is severed from the remainder of the mushroom. Therefore, the amount of root to be cut off can be regulated by raising or lowering the root support slider plate 750. After being cut from the mushroom, the root falls into a suitable hopper 752 shown schematically in FIG. 9. A guide 754 is provided to insure that the root falls within the container 752.

As the mushrooms are serially (and in parallel, several abreast) conveyed beyond the first cutters 740, the unsupported mushroom falls within the generally circular openings until the underside of the mushroom cap rests on the top side of the thin coplanar facing plates 720 and 722. As the mushrooms are further conveyed, each engages a second cutting blade 742 and that part of the stem which extends below the second blade 742 is severed from the mushroom cap. The stem thereupon falls, being guided into a second receiving container shown schematically at 756 and guided by the guide 758.

The cap of the mushroom continues to be conveyed along until it falls off the downstream end of the lower cutter conveyor 70 and into a suitable container located therebeneath. It is preferred that such container for the caps consist of a water holding tank which also catches all the water that falls from above through the cutting mechanism, such tank being shown schematically at 760. The water is pumped from tank 760 back to he first holding tank or reservoir 10 by the pump P shown schematically in FIG. 9, with the result that the water is recirculated continuously.

The foregoing description of the specific embodiment will so fully reveal the general nature of the invention that others can, by applying current knowledge, readily modify such specific embodiment and/or adapt it for various applications without departing from the generic concept, and, therefore, such adaptations and modifications should and are intended to be comprehended within the meaning and range of equivalents.

I claim:

1. In a device for handling mushrooms continuously comprising: means for continuously hydraulically feeding mushrooms of a given size; means for controlling the rate and quantity movement of the mushrooms being hydraulically fed; means for axially orienting the mushrooms into at least one row along a single axis, said orienting means being located downstream from said rate controlling means; means for directionally orienting said axially oriented mushrooms so that the cap of each mushroom is facing in the same direction; means for uniformly refeeding said mushrooms sequentially in timed relationship with one another; and means for cutting said uniformly sequentially fed mushrooms; the improvement wherein:

said rate controlling means comprises a first transversely extending foraminous drum and a second transversely extending foraminous drum downstream from said first drum, a plurality of radially and axially extending foraminous pickup arms located along the periphery of said drums, said drums extending across the width of the device and being located at a vertical level such that the water level in the device passes through said drums, and means to rotate said drums with said second drum at a faster rate than said first drum.

2. A device in accordance with claim 1 wherein said pickup arms are staggered along the periphery of said drums and extend axially over overlapping paths.

3. A device in accordance with claim 1 wherein said means for axially orienting the mushrooms into at least one row along a single axis comprises:

a floor and a plurality of laterally spaced, longitudinally extending, inverted U-shaped baffles defining a plurality of longitudinally aligned corridors between adjacent baffles into which mushrooms are directed in rows for axial orientation, said inverted U-shaped baffles being inclined upwardly from said floor at an acute angle from their upstream position to their downstream position and defining at their upstream ends a V-shaped zone of merger with said floor, the distance across each corridor being of size slightly greater than the cap diameter of the mushrooms being handled;

means to effect hydraulic lift about each V-shaped zone of merger comprising a water jet spray nozzle along each inverted U-shaped baffle for directing water down each baffle to said V-shaped zone; and a plurality of U-shaped flumes, each located immediately downstream from a corridor between said inverted U-shaped baffles, said flumes having a transverse dimension the same as said corridors.

4. A device in accordance with claim 1 wherein said means for directionally orienting said axially oriented mushrooms comprises a pair of segmented conveyor belts having coplanar horizontal top flights and which define therebetween a space for receiving the stem of each mushroom leaving said axially orienting means with the cap being supported by said belts, support wheels for said belts and horizontal axles for said wheels, a pair of stationary vertical guideplates in the stem opening between said conveyor belts to restrain pendulum swinging of the mushroom stems, and means to support said guideplates on said axles.

5. A device in accordance with claim 1 wherein said means for uniformly refeeding said mushrooms sequentially in timed relationship with one another comprises a downwardly sloping tube for receiving mushrooms cap first from said directional orienting means, said tube having an inner diameter slightly greater than the average cap diameter of the mushrooms being handled; a pair of gates near the downstream end of said tube; and means to synchronously open and close said gates so that one said gate is always closed and so that said closed gate slides within said tube from an upstream position to a downstream position while said open gate moves from said downstream position to said upstream position exterior to said tube.

6. A device in accordance with claim 5 wherein said means to synchronously open and close said gates comprises an arm for each gate, each said arm having a bushing at one end and a said gate at the other end, a circular eccentric rotationally mounted in said bushing, and a pair of rigidly mounted cam plates controlling the movement of said arms while said eccentric rotates.

7. In a device for handling mushrooms continuously comprising: means for continuously hydraulically feeding mushrooms of a given size; means for controlling the rate and quantity movement of the mushrooms being hydraulically fed; means for axially orienting the mushrooms into rows along parallel axes, said orienting means being located downstream from said rate controlling means; means for directionally orienting said axially oriented mushrooms so that the cap of each mushroom is facing in the same direction; means for uniformly refeeding said mushrooms sequentially in timed relationship with one another; and means for cutting said uniformly sequentially fed mushrooms; the improvement wherein:

said means for axially orienting the mushrooms into rows along parallel axes comprises:

a floor and a plurality of laterally spaced, longitudinally extending, inverted U-shaped baffles defining a plurality of longitudinally aligned corridors between adjacent baffles into which mushrooms are directed in rows for axial orientation, said inverted U-shaped baffles being inclined upwardly from said floor at an acute angle from their upstream position to their downstream position and defining at their upstream ends a V-shaped zone of merger with said floor, the distance across each corridor being of size slightly greater than the cap diameter of the mushrooms being handled;

means to effect hydraulic lift about each V-shaped zone of merger comprising a water jet spray nozzle along each inverted U-shaped baffle for directing water down each baffle to said V-shaped zone; and a plurality of U-shaped flumes, each located immediately downstream from a corridor between said inverted U-shaped baffles, said flumes having a transverse dimension the same as said corridors.

8. A device in accordance with claim 7 wherein said means for directionally orienting said axially oriented mushrooms comprises a pair of segmented conveyor belts having coplanar horizontal top flights and which define therebetween a space for receiving the stem of each mushroom leaving said axially orienting means with he cap being supported by said belts, support wheels for said belts and horizontal axles for said wheels, a pair of stationary vertical guideplates in the stem opening between said conveyor belts to restrain pendulum swinging of the mushroom stems, and means to support said guideplates on said axles.

9. A device in accordance with claim 7 wherein said means for uniformly refeeding said mushrooms sequentially in timed relationship with one another comprises a downwardly sloping tube for receiving mushrooms cap first from said directional orienting means, said tube having an inner diameter slightly greater than the average cap diameter of the mushrooms being handled; a pair of gates near the downstream end of said tube; and means to synchronously open and close said gates so that one said gate is always closed and so that said closed gate slides within said tube from an upstream position to a downstream position while said open gate moves from said downstream position to said upstream position exterior to said tube.

10. A device in accordance with claim 9 wherein said means to synchronously open and close said gates comprises an arm for each gate, each said arm having a bushing at one end and a said gate at the other end, a circular eccentric rotationally mounted in said bushing, and a pair of rigidly mounted cam plates controlling the movement of said arms while said eccentric rotates.

11. In a device for handling mushrooms continuously comprising: means for continuously hydraulically feeding mushrooms of a given size; means for controlling the rate and quantity movement of the mushrooms being hydraulically fed; means for axially orienting the mushrooms into at least one row along a single axis, said orienting means being located downstream from said rate controlling means; means for directionally orienting said axially oriented mushrooms so that the cap of each mushroom is facing in the same direction; means for uniformly refeeding said mushrooms sequentially in timed relationship with one another; and means for cutting said uniformly sequentially fed mushrooms; the improvement wherein:

said means for uniformly refeeding said mushrooms sequentially in timed relationship with one other comprises a downwardly sloping tube for receiving mushrooms cap first from said directional orienting means, said tube having an inner diameter slightly greater than the average cap diameter of the mushrooms being handled; a pair of gates near the downstream end of said tube; and means to synchronously open and close said gates so that one said gate is always closed and so that said closed gate slides within said tube from an upstream position to a downstream position while said open gate moves from said downstream position to said upstream position exterior to said tube.

12. A device in accordance with claim 11 wherein said means to synchronously open and close said gates comprises an arm for each gate, each said arm having a bushing at one end and a said gate at the other end, a circular eccentric rotationally mounted in said bushing, and a pair of rigidly mounted cam plates controlling the movement of said arms while said eccentric rotates.

UNITED STATES PATENT OFFICE
CERTIFICATE OF CORRECTION

Patent No. 3,545,512            Dated December 8, 1970

Inventor(s)    William H. Baker

It is certified that error appears in the above-identified patent and that said Letters Patent are hereby corrected as shown below:

On the cover sheet [22] "abandoned." should read -- Now Pat. No. 3,596,693 --. Column 1, lines 4 and 5, "now abandoned should read -- now Patent No. 3,596,693. --.

Signed and sealed this 7th day of December 1971.

(SEAL)
Attest:

EDWARD M.FLETCHER,JR.          ROBERT GOTTSCHALK
Attesting Officer                Acting Commissioner of Pater